US009454874B2

(12) United States Patent
Rathsack et al.

(10) Patent No.: US 9,454,874 B2
(45) Date of Patent: Sep. 27, 2016

(54) SYSTEM FOR VALIDATING WAGERING GAME DATA

(75) Inventors: Erhard W. Rathsack, Reno, NV (US); Anussorn Veradej, Las Vegas, NV (US); Andrew R. Atwood, Harmony, ME (US)

(73) Assignee: BALLY GAMING, INC., Las Vegas, NV (US)

( * ) Notice: Subject to any disclaimer, the term of this patent is extended or adjusted under 35 U.S.C. 154(b) by 1756 days.

(21) Appl. No.: 12/527,123

(22) PCT Filed: Feb. 20, 2008

(86) PCT No.: PCT/US2008/054428

§ 371 (c)(1), (2), (4) Date: Oct. 23, 2009

(87) PCT Pub. No.: WO2008/106351

PCT Pub. Date: Sep. 4, 2008

(65) Prior Publication Data

US 2010/0081499 A1 Apr. 1, 2010

Related U.S. Application Data

(60) Provisional application No. 60/892,193, filed on Feb. 28, 2007.

(51) Int. Cl.
*A63F 13/00* (2014.01)
*G07F 17/32* (2006.01)

(52) U.S. Cl.
CPC ........... *G07F 17/3241* (2013.01); *G07F 17/32* (2013.01)

(58) Field of Classification Search
CPC ........... G07F 17/3225; G07F 17/3227; G07F 17/3241
USPC .......................................................... 463/29
See application file for complete search history.

(56) References Cited

U.S. PATENT DOCUMENTS

| | | | | |
|---|---|---|---|---|
| 6,263,331 | B1 * | 7/2001 | Liu et al. | |
| 7,179,170 | B2 | 2/2007 | Martinek et al. | |
| 2002/0059268 | A1 * | 5/2002 | Babaian et al. | 707/100 |
| 2003/0130032 | A1 * | 7/2003 | Martinek et al. | 463/29 |
| 2006/0195460 | A1 * | 8/2006 | Nori et al. | 707/100 |

OTHER PUBLICATIONS

"PCT Application No. PCT/US2008/054428 International Search Report", Jul. 10, 2008, 10 pages.
Jarett, Alex et al., "IDGA Online Games White Paper 2nd Edition—Mar. 2003", *International Game Developers Association* Mar. 2003, pp. 1-140.
"PCT Application No. PCT/US2008/054428 International Preliminary Report on Patentability", Aug. 7, 2009, 12 pages.

* cited by examiner

*Primary Examiner* — James S McClellan
(74) *Attorney, Agent, or Firm* — DeLizio Law, PLLC

(57) ABSTRACT

Systems for validating wagering game data are described herein. In one embodiment, an apparatus includes an application program configured to transmit a request for wagering game data. The apparatus can also include a wagering game data security controller configured to detect the request. The wagering game data security controller can include a wagering game data processor configured to fetch the wagering game data and a reference value from a data store. The wagering game data security controller can also include a wagering game data validator configured to compute a comparison value based on the wagering game data, and to determine whether the comparison value is equal to the reference value. The wagering game data security controller can also include a notifier unit configured to present a notification if the comparison value is not equal to the reference value.

17 Claims, 9 Drawing Sheets

400

402

| ACCOUNT NUMBERS | ACCOUNT HOLERS | ACCOUNT BALANCES |
|---|---|---|
| 11458 | JENNY SMITH | $5000.00 |
| 11549 | CHRIS SMITH | $75.00 |
| 11550 | JOHN DOE | $100.00 |
| 11551 | JANE DOE | $250.00 |

404

| ACCOUNT NUMBER | REFERENCE DATA |
|---|---|
| 11458 | 70.71 |
| 11549 | 8.66 |
| 11550 | 10 |
| 11551 | 15.81 |

FIG. 4

SYSTEM FOR VALIDATING WAGERING GAME DATA

RELATED APPLICATIONS

This application claims the priority benefit of U.S. Provisional Application Ser. No. 60/892,193 filed Feb. 28, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, WMS Gaming, Inc.

FIELD

Embodiments of the inventive subject matter relate generally to wagering game systems, and more particularly to validating wagering game data in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

An apparatus comprising an application program configured to transmit a request for wagering game data; a wagering game data security controller configured to detect the request, the wagering game data security controller including, a wagering game data processor configured to fetch the wagering game data and a reference value from a data store; a wagering game data validator configured to compute a comparison value based on the wagering game data, and to determine whether the comparison value is equal to the reference value; and a notifier unit configured to present a notification if the comparison value is not equal to the reference value.

In some embodiments, the reference value is encrypted in the data store, and wherein the wagering game data processor is further configured to decrypt the reference value.

In some embodiments, the wagering game data processor is further configured to deliver the wagering game data to the application program if the comparison value is equal to the reference value.

In some embodiments, the application program is further configured to use the wagering game data to present wagering games.

In some embodiments, the notifier unit is further configured to insert entries in a log if the comparison value does not equal the reference value.

In some embodiments, the request for wagering game data includes a database command.

In some embodiments, the request for wagering game data includes an operating system call.

In some embodiments, the data store includes a relational database, and wherein the wagering game data processor is further configured to forward the request to the relational database.

A method comprising receiving, from a requestor, a request for wagering game data; fetching the wagering game data and a reference value associated with the wagering game data; computing a comparison value based at least in part on the wagering game data; if the comparison value is equal to the reference value, providing the wagering game data to the requestor; if the comparison value is not equal to the reference value, performing security operations.

In some embodiments, the requestor is a wagering game unit configured to present wagering games.

In some embodiments, the security operations include one or more selected from the group consisting of sending an text message to an attendant, sending a voice message to an attendant, activating audible and visual alarms, disabling access to the wagering game data, and inserting information in a security log.

In some embodiments, the method is further comprising decrypting the wagering game data and the reference value.

In some embodiments, the wagering game data and the reference value are fetched from a relational database.

In some embodiments, the wagering game data and the reference value are fetched from separate relational databases.

In some embodiments, the request includes one or more selected from the group consisting of a database command and an operating system call.

In some embodiments, the fetching the wagering game data and the reference value includes providing the request to a relational database.

A machine-readable medium including instructions executable by a machine, the instructions comprising instructions to receive a database command to modify wagering game data in a relational database; instructions to procure, from the relational database, a first value of the wagering game data; instructions to procure a reference value associated with the wagering game data; instructions to compute a comparison value based in part on the first value of the wagering game data; instructions to compare the comparison value to the reference value; instructions to, if the comparison value is not equal to the reference value, perform security operations; instructions to, if the comparison value is equal to the reference value, determine a second value of the wagering game data, wherein the second value is determined based on the database command; and instructions to, if the comparison value is equal to the reference value, store the second value of the wagering game data in the relational database.

In some embodiments, the reference value and the wagering game data are stored in different tables in the relational database.

In some embodiments, the reference value is stored in another relational database.

In some embodiments, the security operations include one or more selected from the group consisting of sending a text message to an attendant, sending a voice message to an attendant, activating audible and visual alarms, and inserting information in a security log.

BRIEF DESCRIPTION OF THE FIGURES

Embodiments of the invention are illustrated in the Figures of the accompanying drawings in which:

FIG. 4 is a block diagram illustrating a database including wagering game data, according to example embodiments of the invention;

DESCRIPTION OF THE EMBODIMENTS

This description of the embodiments is divided into five sections. The first section provides an introduction to embodiments of the invention, while the second section describes example wagering game network devices. The third section describes example operations performed by some embodiments and the fourth section describes example wagering game machines in more detail. The fifth section presents some general comments.

Introduction

This section provides an introduction to some embodiments of the invention.

Figure 1:
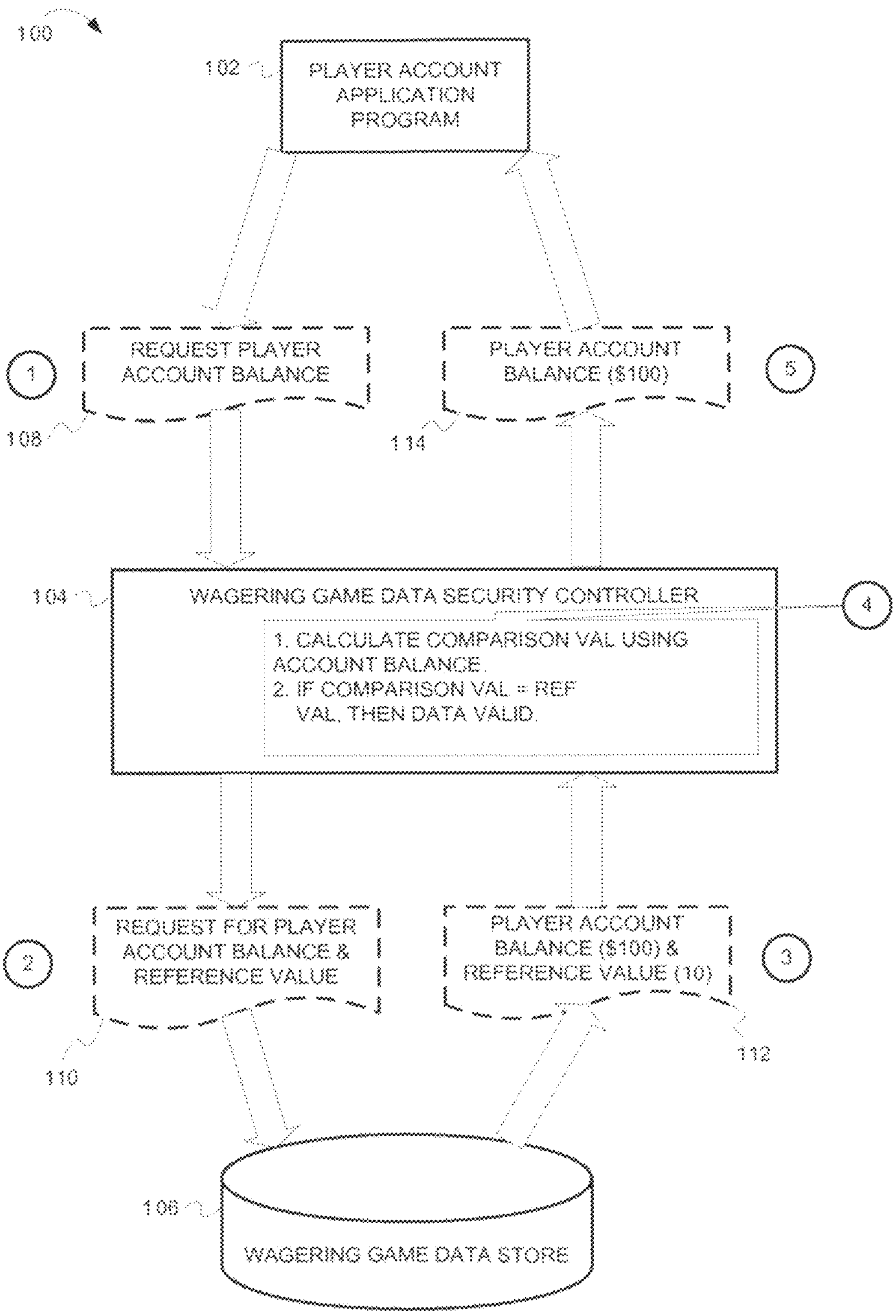
FIG. 1 is a dataflow diagram illustrating dataflow and operations for validating wagering game data, according to example embodiments of the invention.

Wagering game systems are frequent targets for attack. As a result, complex wagering game systems typically employ measures for controlling system access and securing program code. Such security measures may use passwords to prevent unauthorized access and/or digital signatures to authenticate program code before execution. While security measures like passwords and code authentication enhance security, they may not be suitable for checking the integrity of wagering game data. However, some embodiments of the invention enable wagering game systems to validate wagering game data when the data is stored to and retrieved from a data store. FIG. 1 describes these and other features.

FIG. 1 is a dataflow diagram illustrating dataflow and operations for validating wagering game data, according to example embodiments of the invention. In FIG. 1, a player account server 100 includes a player account application program 102, wagering game data security controller ("security controller") 104, and wagering game data store 106. The five stages of in FIG. 1 show how the player account server 100 can validate a player's account balance as the balance is fetched for use in funding a wagering game.

During stage one, in processing a monetary transaction, the player account application program 102 requests a player's account balance. As shown, the security controller 104 receives the account balance request 108. During stage two, the security controller 104 requests the player's account balance and an associated reference value. The reference value can be a value based on the player's account balance. For example, the reference value can be the square root of the player's account balance. Thus, an account balance of $100 would have a reference value of 10. In other embodiments, the reference value can be determined using any suitable algorithm.

During stage three, the security controller 104 receives the player's account balance (e.g., $100) and its associated reference value (e.g., 10). During stage four, the security controller 104 determines whether the account balance is valid. That is, the security controller 104 computes a comparison value based on the account balance. For example, the security controller 104 can calculate a comparison value of 10, by computing the square root of $100. If the comparison value equals the reference value received from the data store 106, the account balance is valid. Otherwise, the account balance is invalid (i.e., the account balance has been altered). If the security controller 104 discovers invalid wagering game data, it can disable further access to the player account and alert an attendant. As a result, an attacker could not use fraudulently altered wagering game data.

During stage five, the security controller 104 delivers the player account balance (e.g. $100) to the player account application program 102. After receiving the player account balance, the player account application program 102 can perform operations for funding a wagering game.

Although FIG. 1 describes some embodiments, the following sections describe many other features and embodiments.

Example Operating Environment

This section describes an example operating environment and provides structural aspects of some embodiments. In particular, this section describes wagering game networks and wagering game machine architectures that can include embodiments of the invention.

Wagering Game Networks

Figure 2:
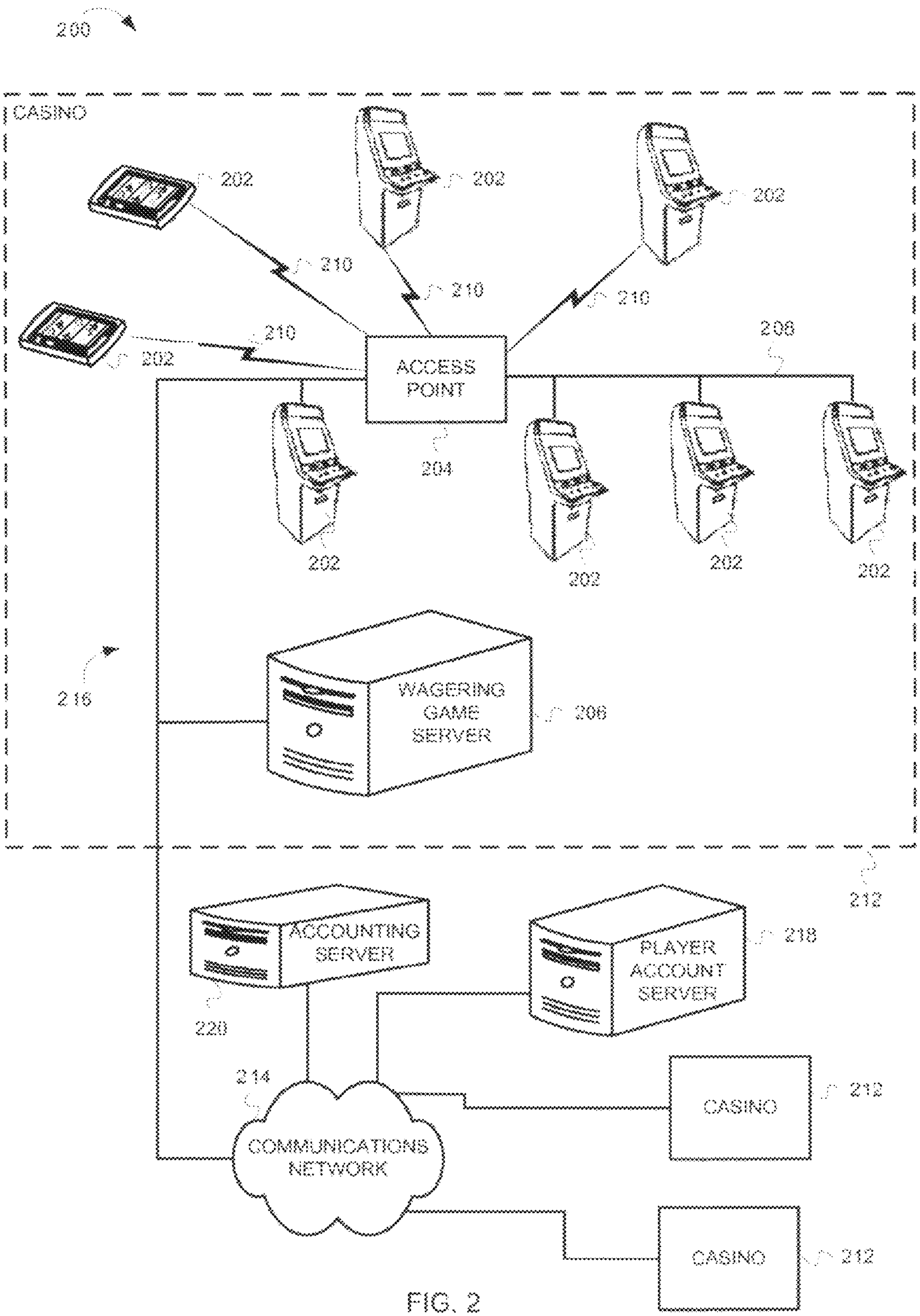
FIG. 2 is a block diagram illustrating a wagering game network, according to example embodiments of the invention.

FIG. 2 is a block diagram illustrating a wagering game network, according to example embodiments of the invention. As shown in FIG. 2, the wagering game network 200 includes a communications network 214 connected to a plurality of casinos 212. Each casino 212 includes a local area network 216, which includes an access point 204, a wagering game server 206, and wagering game machines 202. The access point 204 provides wireless communication links 210 and wired communication links 208. The wired and wireless communication links can employ any suitable connection technology, such as Bluetooth, 802.11g, Ethernet, public switched telephone networks, SONET, etc. In some embodiments, the wagering game server 206 can serve wagering games and distribute content to devices located in other casinos 212 or at other locations on the communications network 214.

The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc.

In some embodiments, wagering game machines 202 and wagering game servers 206 work together such that a wagering game machine 202 can be operated as a thin, thick, or intermediate client. For example, one or more elements of game play may be controlled by the wagering game machine 202 (client) or the wagering game server 206 (server). Game play elements can include executable game code, lookup tables, configuration files, game outcome, audio or visual representations of the game, game assets or the like. In a thin-client example, the wagering game server 206 can perform functions such as determining game outcome or managing assets, while the wagering game machine 202 can present a graphical representation of such outcome or asset modification to the user (e.g., player). In a thick-client example, the wagering game machines 202 can determine game outcomes and communicate the outcomes to the wagering game server 206 for recording or managing a player's account.

In some embodiments, either the wagering game machines 202 (client) or the wagering game server 206 can provide functionality that is not directly related to game play. For example, account transactions and account rules may be managed centrally (e.g., by the wagering game server 206) or locally (e.g., by the wagering game machine 202). Other functionality not directly related to game play may include power management, presentation of advertising, software or firmware updates, system quality or security checks, etc. Any of the wagering game network components (e.g., the wagering game machines 202) can include hardware and machine-readable media including instructions for performing the operations described herein.

The communications network 214 is also connected to a player account server 220 and an accounting server 218. The wagering game network 200 can also include other network devices, such as wide area progressive servers, wagering game maintenance servers, etc.

Figure 3A:
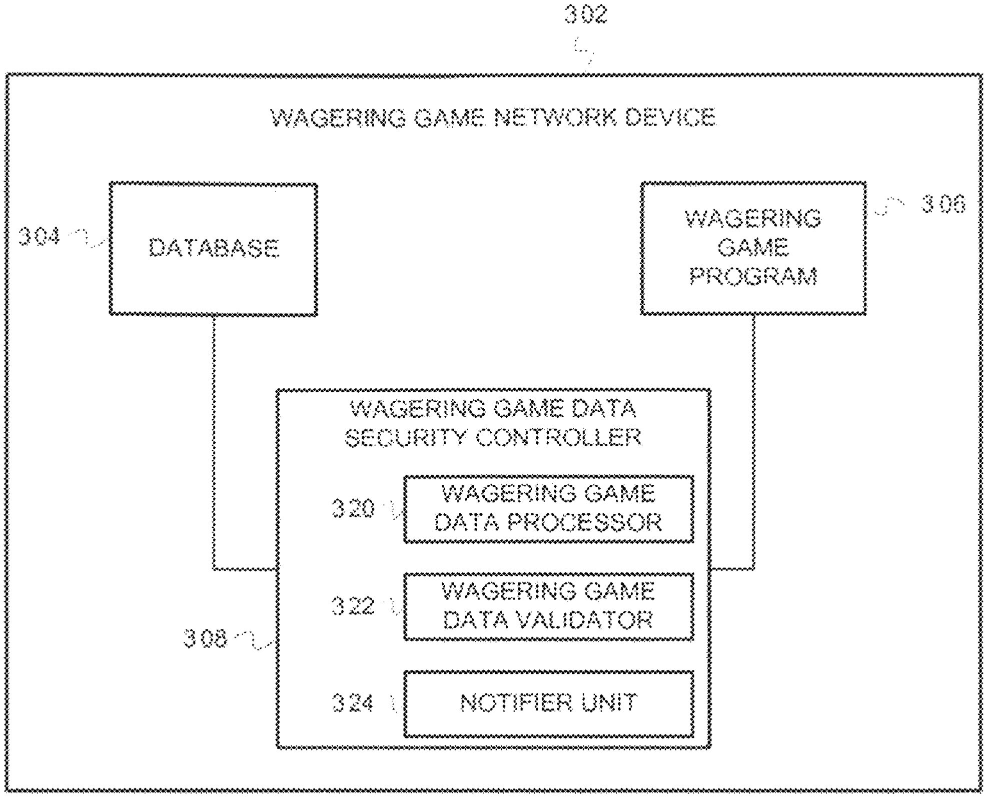
FIG. 3A is a block diagram illustrating a wagering game network device architecture including a wagering game data security controller, according to example embodiments of the invention.
Figure 3B:
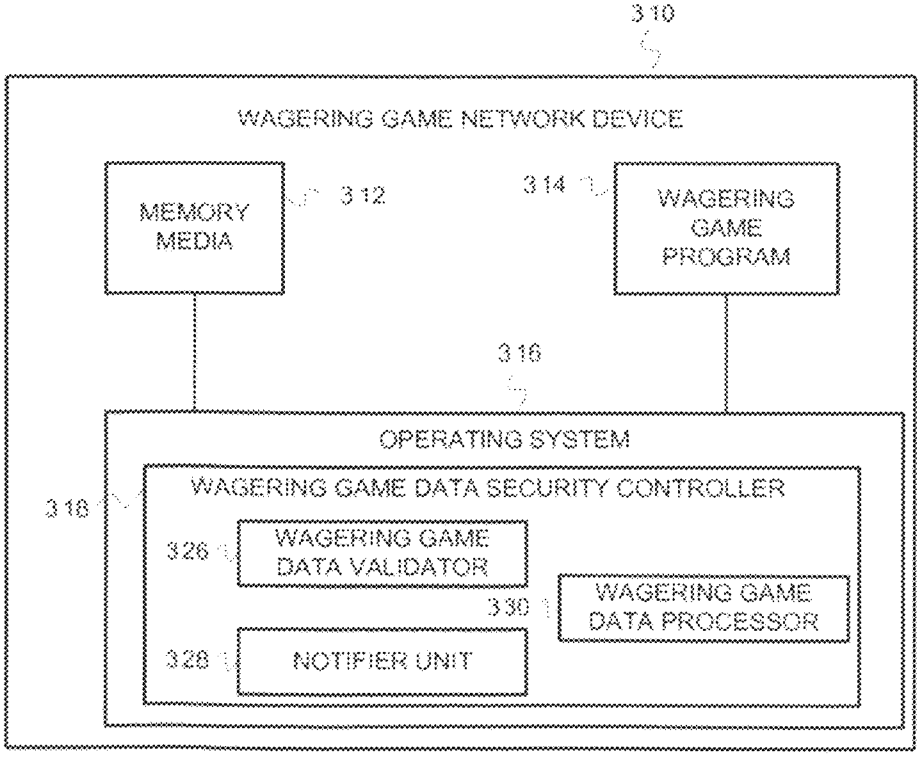
FIG. 3B is a block diagram illustrating another wagering game network device architecture including a security controller, according to example embodiments of the invention.

In some embodiments, the player account server 218, accounting server 220, and other wagering game network devices can store sensitive wagering game data, such as financial information relating to wagering game players and wagering game machines. For example, the player account server 218 can include player account numbers, player account balances, player account transaction records, and other information used for funding wagering games. Similarly, the accounting server 220 can include financial records that show financial transactions of wagering game machines, casinos, and other network devices. These and other devices can also store other sensitive information, such as players' personal information, social security numbers, hotel room numbers, etc. In some embodiments, the player account server 218, accounting server 220, and other network devices can include a wagering game data security controller that validates wagering game data. FIGS. 3A & 3B show embodiments that include a wagering game data security controller.

FIG. 3A is a block diagram illustrating a wagering game network device architecture including a wagering game data security controller, according to example embodiments of the invention. In FIG. 3A, the wagering game network device 302 includes a database 304, wagering game program 306, and wagering game data security controller ("security controller") 308. The database 304 can be configured according to any suitable database model, such as a relational model, hierarchical model, flat model, dimensional model, etc.

In FIG. 3A, the security controller 300 includes a wagering game data processor ("data processor") 320, a wagering game data validator ("data validator") 322, and notifier unit 324. In some embodiments, the security controller's data validator 322 computes reference values and comparison values for sensitive wagering game data. The data validator 322 can use any suitable process for computing reference data. In some embodiments, the data validator 322 can compute reference data using wagering game data and other associated data. For example, the security controller 308 can use any of the following methods to compute a reference value for each player account balance shown in FIG. 3:

1) Reference Value=Account Number/Sqrt (Account Balance);
2) Reference Value=Sqrt (Account Balance+Account Number)
3) Reference Value=Account Balance/Pi While some embodiments can use these methods for computing reference data, other embodiments can also use other methods. For example, some embodiments can use complex or simple hashing algorithms that are based on one or more data fields. In some embodiments, the data validator 322 computes reference data when data is initially stored in the database 304 or other data store.

In some embodiments, the security controller 308 can "intercept" the wagering game program's calls to the database 304. For example, the security controller's data processor 320 can receive database calls from the wagering game program 306. In turn, the data processor 320 can fetch the requested data and any associated reference value(s) from the database 304. Before delivering the data to the player account program 306, the data validator 322 can validate the data.

In some embodiments, a watchdog process (not shown) can direct the security controller 308 to periodically validate wagering game data. If the watchdog process finds invalid data, it can block further access to the invalid data (e.g., it can block access to all data associated with a wagering game account). The watchdog process can run in the background while other processes are running. Alternatively, the security controller 308 itself can perform the operations of the watchdog process. As a result, the security controller 308 can provide security measures beyond the transaction-based security described herein.

In some embodiments, the security controller 308 can be implemented as an application program or other software component (e.g., procedures stored in the database 304). Alternatively, it can be a hardware device disposed within the wagering game network device 302, a plug-in-style dongle, or other suitable combination of hardware and software. Also, the security controller 308 can include tamper proof hardware that generates/stores dynamic key pairs for use with algorithms used for validating wagering game data (e.g., hashing algorithms, encryption algorithms, etc.)

FIG. 4 shows how some embodiments of a database can organize wagering game data and reference values.

FIG. 4 is a block diagram illustrating a database including wagering game data, according to example embodiments of the invention. In some embodiments, a database includes a plurality of tables for storing wagering game information and reference data. In FIG. 4, the database 400 includes, a table 402 for storing player account information, including player account numbers, player account holders, and player account balances. The database 400 also includes a table 404 for storing reference data associated with each player account. The table 404 includes a reference value for each player account, where the reference value is calculated by taking the square root of the account balance. For example, for account number 11458, the account balance is $5000, so the reference value is 70.71. In some embodiments, when account balances are accessed (e.g., to fund wagering games), a security controller uses the reference values to validate the account balances.

While FIG. 4 shows one reference value associated with each account, any piece of wagering game data can be associated with one or more pieces of reference data. Furthermore, the database 400 can include a plurality of relational databases, where reference data and wagering game data can be stored in separate databases. Alternatively, the reference data and wagering game data can be stored in a single table. Also, in some embodiments, the reference data and/or the wagering game data can be encrypted. The discussion continues with a description of FIG. 3B.

FIG. 3B is a block diagram illustrating another wagering game network device architecture including a security controller, according to example embodiments of the invention. In FIG. 3B, the wagering game network device 310 includes memory media 312, a wagering game program 314, and an operating system 316. As shown, the operating system 316 includes a security controller 318, which includes a data processor 330, data validator 326, and notifier unit 328. In some embodiments, when the operating system 316 receives a request to fetch or store wagering game data, the security controller 318 can validate the data before completing the request.

In some embodiments, the security controller 318 can be separate from the operating system 316. For example, the security controller 318 can be a separate application program or it can be integrated with the wagering game program 314 or other software in the device 310. In some embodiments, the wagering game application 314 can access the memory media 312 without calling the operating system 316. As such, the wagering game program 314 can include the security controller 318, whereby the program 314 can validate wagering game data as described above. In some embodiments, the security controller 318 can itself or in concert with a watchdog periodically validate wagering data, as described above.

While the network devices described in FIGS. 3A-4 include components for validating wagering game data, they can also include other components for performing other tasks. As a result, the wagering game network devices can implemented as wagering game machines, wagering game servers, player account servers, wide area progressive serves, etc. This section continues with a discussion of wagering game machine architectures.

Wagering Game Machine Architectures

Figure 5:
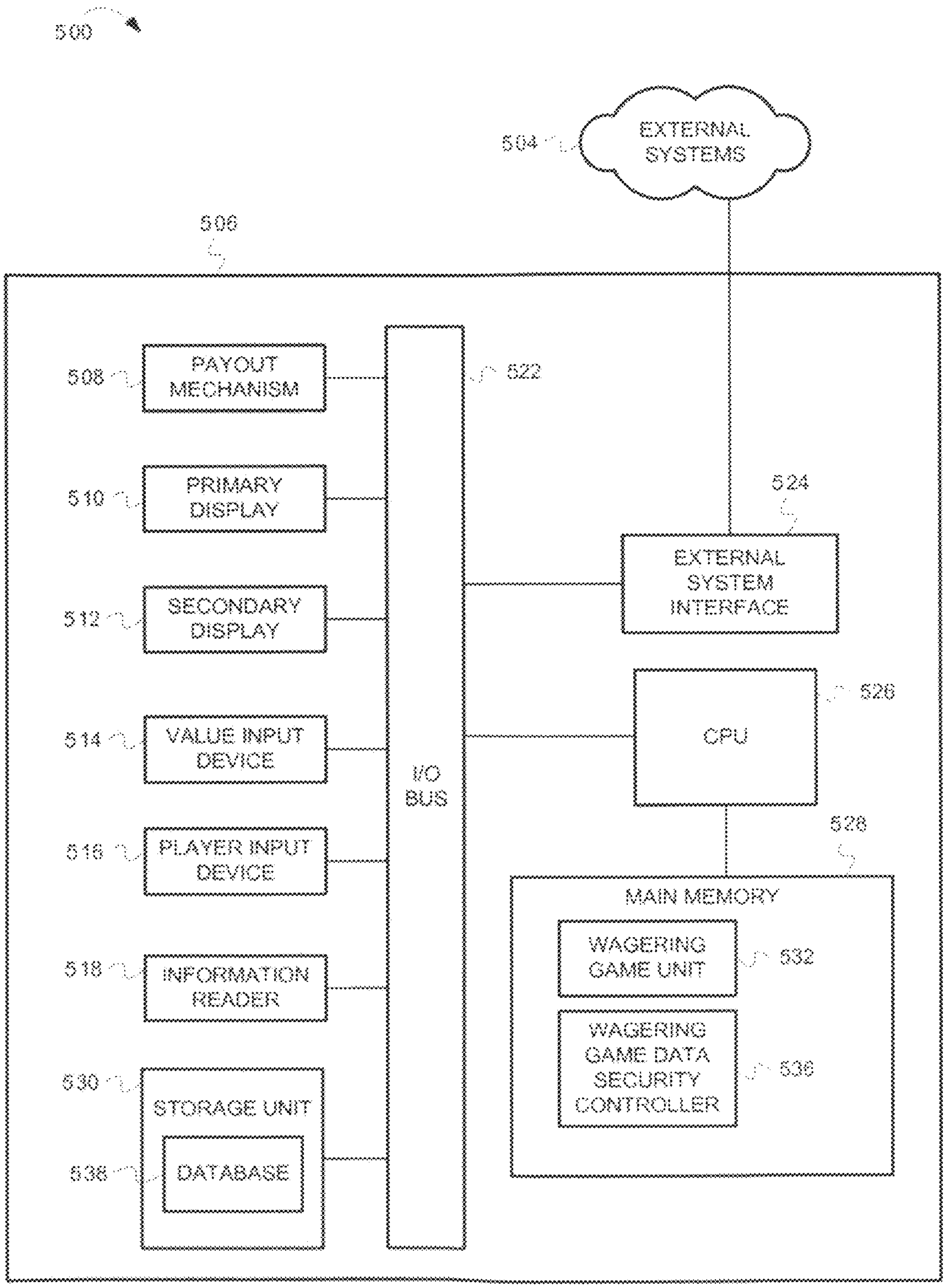
FIG. 5 is a block diagram illustrating a wagering game machine architecture, according to example embodiments of the invention.

FIG. 5 is a block diagram illustrating a wagering game machine architecture, according to example embodiments of the invention. As shown in FIG. 5, the wagering game machine architecture 500 includes a wagering game machine 506 including a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game unit 532 and a security controller 536. In some embodiments, the wagering game unit 532 can present wagering games, such as video poker, video black jack, video slots, video lottery, etc., in whole or part. In some embodiments, the security controller 536 can include a wagering game data processor, wagering game data validator, and notifier unit (e.g., see FIGS. 3A & 3B). In some embodiments, the security controller 536 can validate wagering game data as the data is used in presenting wagering games.

The CPU 526 is connected to an input/output (I/O) bus 522, which can include any suitable bus technologies, such as an AGTL+frontside bus and a PCI backside bus. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The storage unit 530 includes a database 538 that can include sensitive wagering game data. The database 538 can include a relational database, flat file database, directory database, etc. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and/or multiple CPUs 526. In one embodiment, any of the components can be integrated or subdivided.

Any component of the architecture 500, or any other embodiment described herein (see FIGS. 3A-4), can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel.

Figure 6:
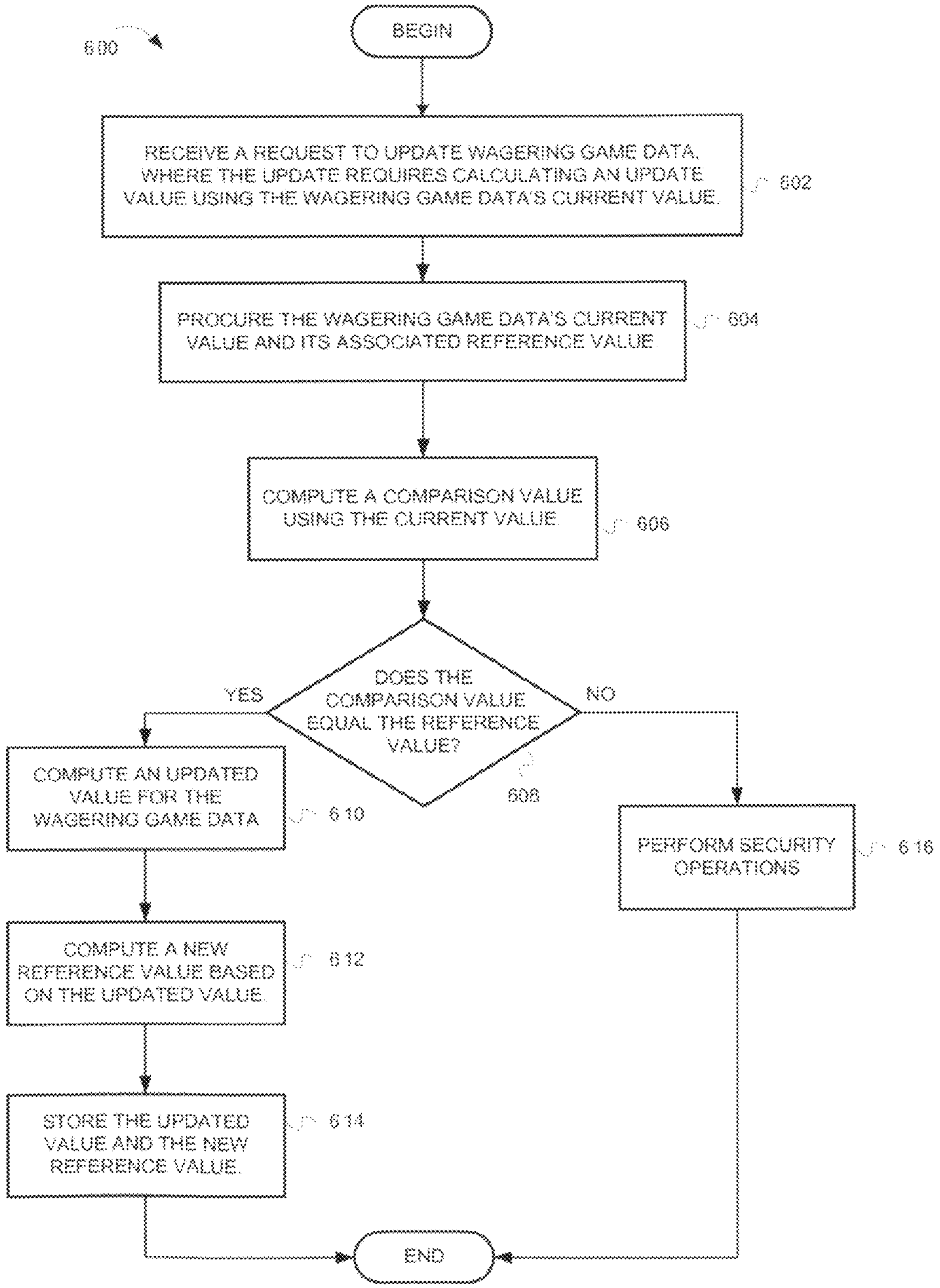
FIG. 6 is a flow diagram illustrating operations for validating wagering game data as part of a database update operation, according to some embodiments of the invention.
Figure 7:
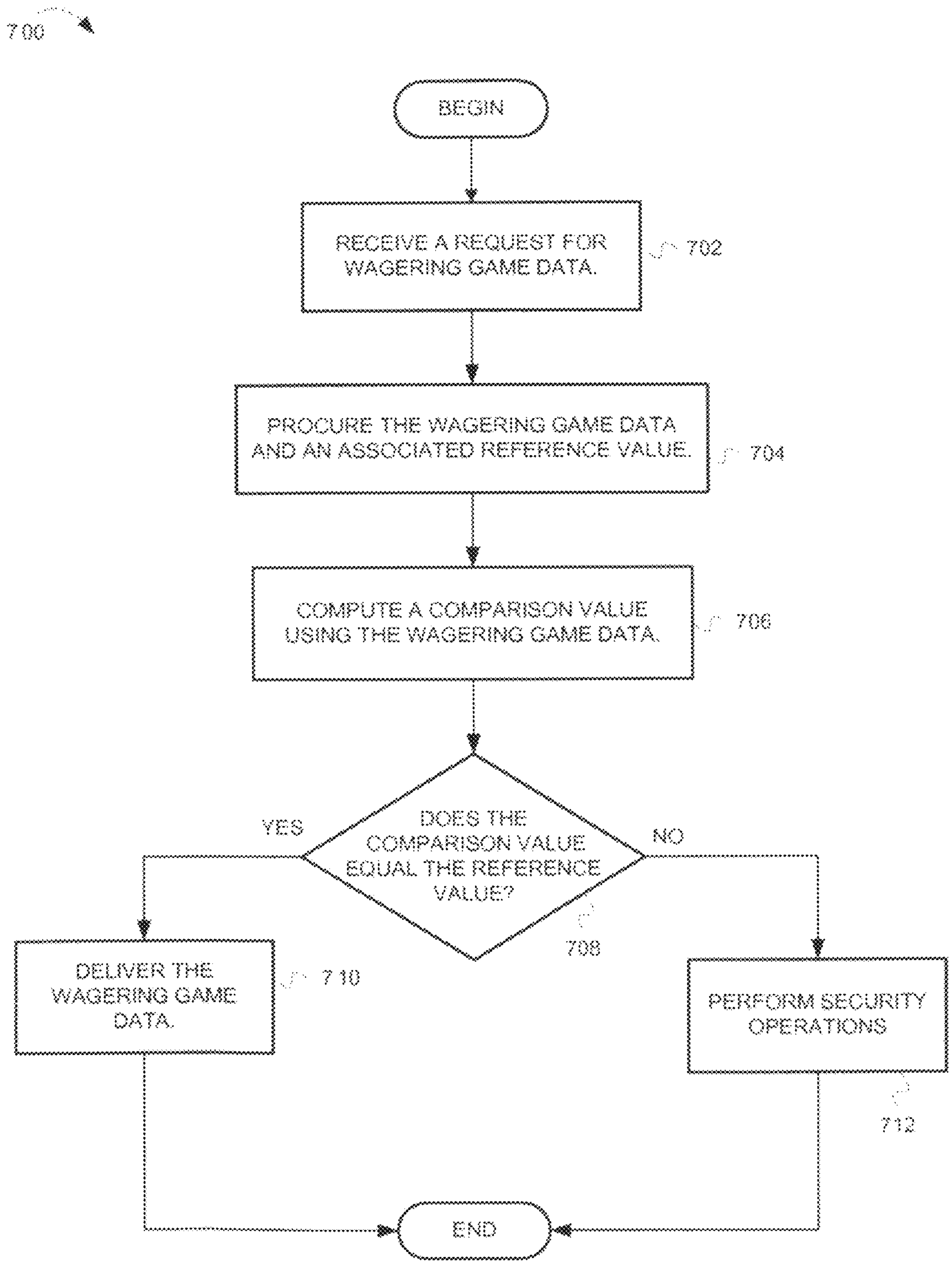
FIG. 7 is a flow diagram illustrating operations for validating wagering game data as the data is retrieved from a data store, according to some embodiments of the invention.
Figure 8:
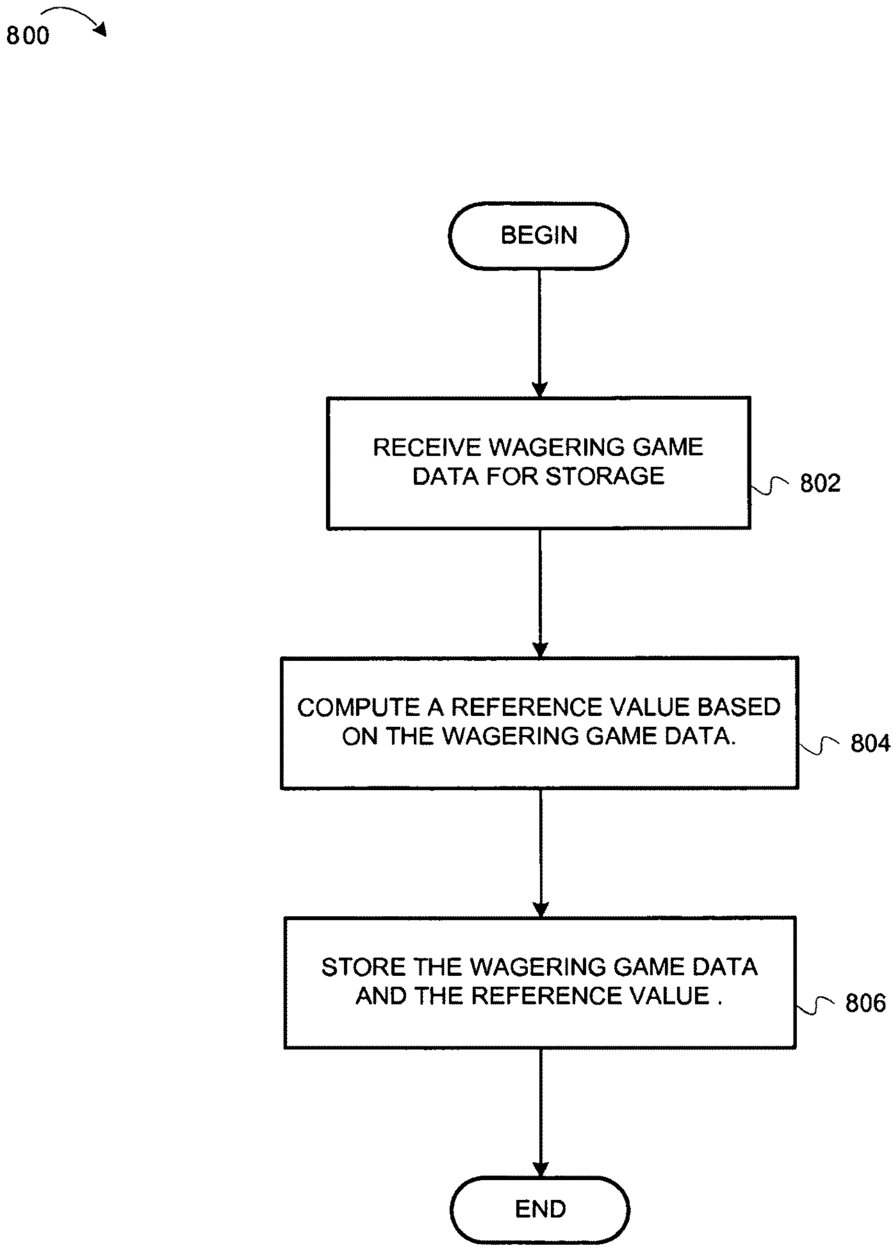
FIG. 8 is a flow diagram illustrating operations for validating wagering game data when the data is stored to a data store, according to some embodiments of the invention.

The section continues with a discussion of FIGS. 6-8, which show operations for validating wagering game data.

FIG. 6 is a flow diagram illustrating operations for validating wagering game data as part of a database update operation, according to some embodiments of the invention. The flow 600 begins at block 602.

At block 602, the security controller 308 receives a request to update wagering game data in the database 304. In some embodiments, the request can be in the form of a database update command. For example, the request can be a database update command formatted as follows:

```
UPDATE Account_Info_Table SET
    Account_Balance=Account Balance+$25
    WHERE Account_number=11551
```

Because the update request can be in the form of a database command, some embodiments of the security controller 308 can parse the database command and determine a new value for the wagering game data (e.g., the account balance). For example, referring to the example database update command noted above, the security controller 308 can determine a value for "Account_Balance=Account Balance+$25". Operations for determining the new value are shown in blocks 604 to 614 of FIG. 6. The flow continues at block 604.

At block 604, the security controller's data processor 320 procures the wagering game data and its associated reference value. For example, the data processor 320 retrieves from the database 304 an account balance ($250) and a reference value (15.81) associated with the account number 11551. The flow continues at block 606.

At block 606, the security controller's data validator 322 computes a comparison value using the wagering game data. For example, using the account balance ($250) retrieved at 604, the data validator 322 computes a comparison value by taking the square root of $250. For this example, the comparison reference value is 15.81.

At block 608, the data validator 322 determines whether the comparison value is equal to the reference value. If the comparison value equals the reference value (retrieved at block 604), the flow continues at block 610. Otherwise, the flow continues at block 616.

At block 610, the data processor 320 computes an updated value for the wagering game data. For example, based on the database command (see above), the data processor 320 adds $25 to the $250 account balance, resulting in an updated account balance of $300. The flow continues at block 612.

At block 612, the data validator 322 computes a new reference value based on the updated wagering game data. For example, the data validator 322 computes a new reference value by computing the square root of $300. The new reference value would be 17.32. The flow continues at block 614.

At block 614, the data processor 320 stores the updated wagering game data and the new reference value in the database 304. In some embodiments, the data processor 320 stores this data by forwarding the database command (received at block 602) to the database. Alternatively, the data processor 320 can store the updated value using a new database command in which the updated wagering game data is explicitly cited. From block 614, the flow ends.

Referring back to block 608, as noted, if the comparison value does not equal the reference value, the flow continues at block 616. At block 616, the security controller's notifier unit 324 performs security operations. In some embodiments, the security operations include activating audible and/or visual alarms, sending voice and/or e-mail messages, making entries in security logs, etc. The notifier unit 324 can also block further access to the invalid data. For example, the notifier unit 324 can block access to any data associated with a wagering game account. In some embodiments, only certain authorized users can restore access to blocked data. From block 616, the flow ends.

This section continues with a discussion of FIGS. 7 and 8. FIGS. 7 and 8 describe embodiments of the security controller that validate wagering game data as the data is retrieved (FIG. 7) and stored (FIG. 8). The operations shown in FIGS. 7 and 8 can be performed by wagering game network devices in which the security controller is: 1) part of an operating system, 2) a stand-alone component (see FIGS. 3A & 5), or 3) integrated into components that process wagering game data (e.g., an application program). In other embodiments, the security controller can exhibit other configurations.

FIG. 7 is a flow diagram illustrating operations for validating wagering game data as the data is retrieved from a data store, according to some embodiments of the invention. The flow 700 begins at block 702.

At block 702, the security controller 318 receives a request for wagering game data. The request can originate from a wagering game program 314 or other component of the wagering game network device. In some embodiments, the request can be formatted as a database command, operating system call, command for directly accessing an addressable storage medium, etc. The flow continues at block 704.

At block 704, the security controller's data processor 330 procures the wagering game data and any associated reference value from the memory media 312. In some embodiments, the wagering game data and/or reference data can be encrypted. Thus, the data processor 330 can decrypt the encrypted wagering game data and/or reference data. The flow continues at block 706.

At block 706, the security controller's data validator 326 computes a comparison value based on the wagering game data. The flow continues at block 708.

At block 708, the data validator 326 determines whether the comparison value is equal to the reference value. If the comparison value is equal to the reference value, the flow continues at block 710. Otherwise, the flow continues at block 712.

At block 710 security content's data processor 330 delivers the wagering game data to the requester (e.g., a wagering game program). From block 710, the flow ends.

At block 712, the security controller's notifier unit 328 performs security operations. In some embodiments, the security operations include activating audible and/or visual alarms, sending voice and/or e-mail messages, making entries in security logs, etc. The notifier unit 328 can also block further access to the invalid data. For example, the notifier unit 328 can block access to any data associated with a wagering game account. In some embodiments, only certain authorized uses can restore access to blocked data. From block 712, the flow ends.

While FIG. 7 describes validating wagering game data when the data is retrieved from a data store, this section continues with a discussion of operations for validating wagering game data as the data is stored to a data store.

FIG. 8 is a flow diagram illustrating operations for validating wagering game data when the data is stored to a data store, according to some embodiments of the invention. The flow 800 begins at block 802.

At block 802, the security controller 318 detects a request to store wagering game data in a data store. For example, the security controller 318 detects a request to store an account balance on the memory media 312. In some embodiments, the request can include a database update command (e.g., an SQL insert or update query), a programming language command (e.g., an operating system call), or other suitable command. Furthermore, the request can explicitly or implicitly indicate the wagering game data to be stored. For example, the request can indicate the wagering game data as follows:

1) Account_Balance=$300 (explicit), or

2) Account_Balance=Account_Balance+25 (implicit)

The flow continues at block 804.

At block 804, the security controller's data validator 326 computes a reference value based on the wagering game data. For example, the data validator 326 can compute a reference value for an account balance by computing the square root of the account balance. The flow continues at block 806.

At block 806, the security controller's data processor 330 stores the wagering game data and the reference value in a data store, such as a memory media 312. In some embodiments, the data processor stores the wagering game data by passing a database command (e.g., an SQL query) to a database. From block 806, the flow ends.

Example Wagering Game Machines

Figure 9:
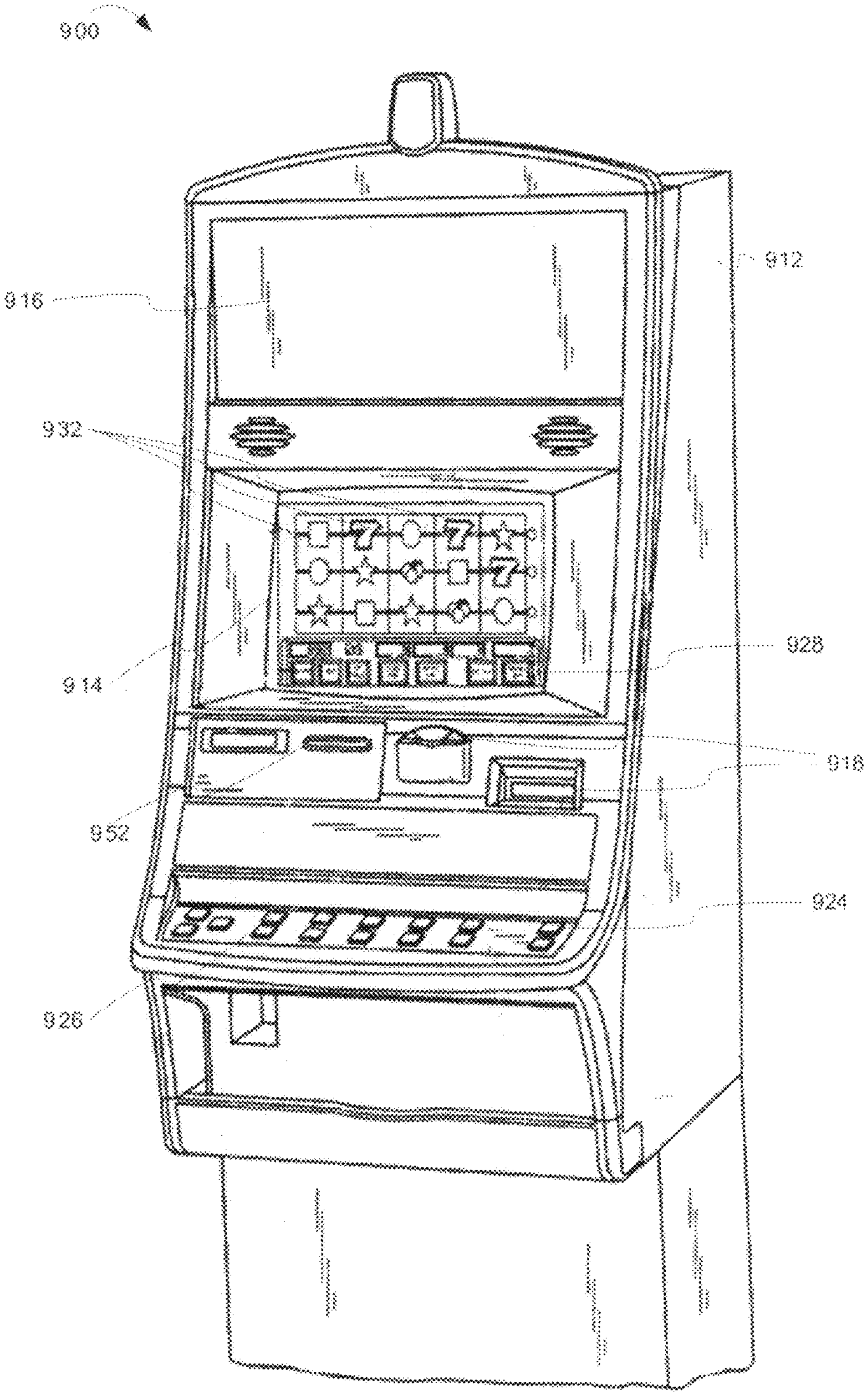
FIG. 9 is a perspective view of a wagering game machine, according to example embodiments of the invention.

FIG. 9 is a perspective view of a wagering game machine, according to example embodiments of the invention. Referring to FIG. 9, a wagering game machine 900 is used in gaming establishments, such as casinos. According to embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bartop model, mobile handheld model, or workstation console model.

A player begins playing a basic wagering game by making a wager via the value input device 918. The player can initiate play by using the player input device's buttons or touch screen 928. The basic game can include arranging a plurality of symbols along a payline 932, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes and embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

The invention claimed is:

1. An apparatus comprising:

an application program configured to provide a database instruction to modify a wagering game account balance associated with a player;

a wagering game data security controller configured to detect the database instruction, the wagering game data security controller including, a wagering game data validator configured to compute a comparison value based on the wagering game account balance; and determine whether the comparison value is equal to a reference value associated with the wagering game account information; and a wagering game data processor configured to fetch, from a relational database, the wagering game account balance and the reference value;

provide the reference value to the wagering game data validator;

modify, according to the database instruction, the wagering game account balance if the comparison value is equal to the reference value; and a notifier unit configured to present a notification if the comparison value is not equal to the reference value.

2. The apparatus of claim 1, wherein the reference value is encrypted in the relational database, and wherein the wagering game data processor is further configured to decrypt the reference value.

3. The apparatus of claim 1, wherein the wagering game data processor is further configured to deliver the modified wagering game account balance to the application program if the comparison value is equal to the reference value.

4. The apparatus of claim 1, wherein the application program is further configured to use the wagering game account balance to fund wagering games.

5. The apparatus of claim 1, wherein the notifier unit is further configured to insert entries in a log if the comparison value does not equal the reference value.

6. The apparatus of claim 1, wherein the wagering game account balance and the reference value reside in the same table in the relational database.

7. A method for verifying and modifying wagering game data in a wagering game operating system, the method comprising:

detecting a command to modify wagering game data in a data store, the command originating from a wagering game application program executing with support of the wagering game operating system;

procuring, from the data store, the wagering game data;

procuring, from the data store, a reference value associated with the wagering game data;

computing a comparison value based on the wagering game data;

comparing the comparison value to the reference value;

if the comparison value is not equal to the reference value, notifying an attendant;

if the comparison value is equal to the reference value, modifying the wagering game data according to the command and storing modified wagering game data in the relational database.

8. The method of claim 7, wherein the wagering game application is configured to present wagering games using the wagering game data.

9. The method of claim 7, wherein the notifying includes one or more selected from the group consisting of sending an text message to an attendant, sending a voice message to an attendant, activating audible or visual alarms.

10. The method of claim 7 further comprising:

decrypting the wagering game data and the reference value.

11. The method of claim 7, wherein the data store include a relational database, and wherein the wagering game data and reference value are fetched form the relational database.

12. The method of claim 7, wherein the command is a call to the operating system.

13. The method of claim 7, wherein the data store includes a relational database, and wherein the procuring of the wagering game data and the reference value includes providing the command to the relational database.

14. One or more non-transitory machine-readable storage devices including instructions executable by a machine, the instructions comprising:

instructions to receive a database command to modify wagering game account balance in a relational database;

instructions to procure, from the relational database, the wagering game account balance;

instructions to procure, from the relational database, a reference value associated with the wagering game account balance;

instructions to compute a comparison value based at least in part on the wagering game account balance;

instructions to compare the comparison value to the reference value;

instructions to, if the comparison value is not equal to the reference value, perform security operations;

instructions to, if the comparison value is equal to the reference value, modify the wagering game account balance based on the database command; and instructions to, if the comparison value is equal to the reference value, store the modified wagering game account balance in the relational database.

15. The one or more non-transitory machine-readable storage devices of claim 14, wherein the reference value and the wagering game account balance are stored in different tables in the relational database.

16. The one or more non-transitory machine-readable storage devices of claim 14, wherein the reference value and the wagering game account balance are stored in the same tables of the relational database.

17. The one or more non-transitory machine-readable storage devices of claim 14, wherein the security operations include one or more selected from the group consisting of sending a text message to an attendant, sending a voice message to an attendant, activating audible and visual alarms, or inserting information in a security log.

* * * * *